Feb. 17, 1953   E. F. PACKARD   2,628,513
BURRING TOOL
Filed May 9, 1950
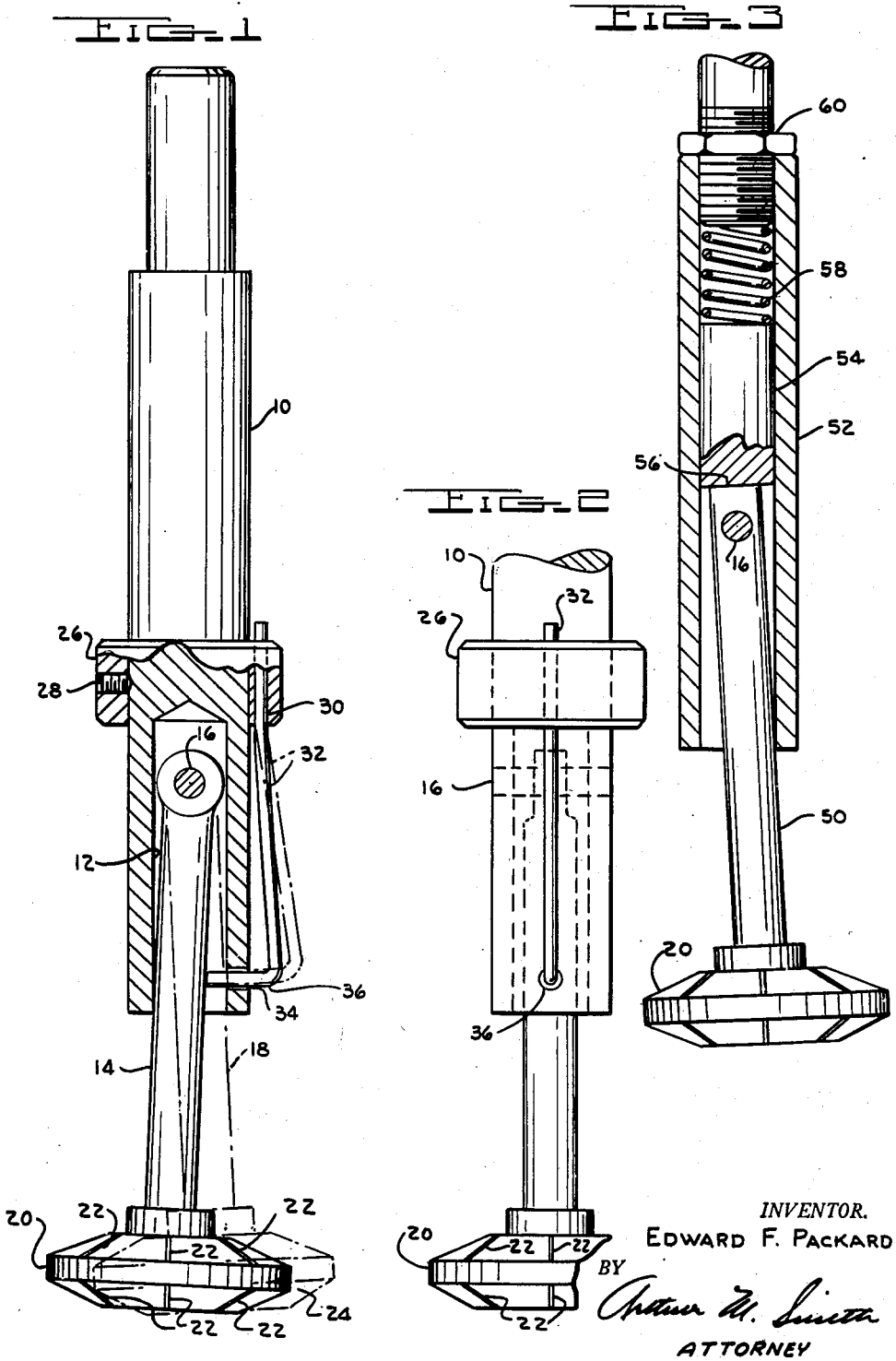
INVENTOR.
EDWARD F. PACKARD
BY
ATTORNEY Patented Feb. 17, 1953

2,628,513

UNITED STATES PATENT OFFICE 2,628,513

BURRING TOOL

Edward F. Packard, Detroit, Mich., assignor to Walter E. Harrer, Southfield, Mich.

Application May 9, 1950, Serial No. 160,998

9 Claims. (Cl. 77—73.5)

The present invention relates to a tool for removing burrs and the like from edges of holes which have been drilled or punched in metal or other material, and more particularly to a tool which will enable the operator to remove burrs and the like from the edges of a hole at each of its opposite ends in one cycle of operation of a drill press.

When drilling into or through work pieces made of material such as metal or the like, burrs are frequently formed about the edges of the hole which may be highly objectionable for subsequent working operations. This also is true where a punching operation has been preformed on a work piece for punching holes therein. It therefore becomes necessary for the operator to deburr such drilled or punched holes before the subsequent working operations are performed.

Where such deburring operations must be carried out, considerable time may be lost and excessive breakage of tools may occur when using tools heretofore known in carrying out this operation. Accordingly, it is an object of the present invention to provide a tool for carrying out deburring operations which is adapted to remove the burrs from either one or both sides of a hole in a work piece in one cycle of operation of the drill press, and which has a cutter head with a plurality of cutting teeth for engaging the work piece during the deburring operations whereby breakage of the tools will be reduced to a minimum when removing large burrs or when removing burrs from a work piece which may be cracked or may have a split therein.

It is another object of the present invention to provide a tool for removing burrs and the like from a work piece wherein the cutter head will be self piloting to permit the cutter head to cut any chips which may have remained in the hole and thereby to prevent jamming of the tool in such hole.

It is still another object of the present invention to provide a tool with an offset spring biased cutter head for removing burrs and the like from a work piece wherein maximum use thereof can be obtained before resharpening thereof will be required, and further which is constructed and arranged to permit the operator to selectively determine the spring pressure to be used in biasing the cutter head whereby said tool can be used for deburring metal and the like of different hardnesses.

It is still another object of the present invention to provide a tool for removing burrs and the like from a work piece and which is simply but ruggedly constructed to insure a long life and economical use thereof, and which can be constructed, maintained and repaired at a minimum cost.

Other objects of this invention will appear in the following description and appended claims, reference being had to the accompanying drawings forming a part of this specification wherein like reference characters designate corresponding parts in the several views.

In the drawings:

Fig. 1 is a front elevational view partly in section of one embodiment of a deburring tool of the present invention.

Fig. 2 is a fragmentary side view of the embodiment of the invention shown in Fig. 1.

Fig. 3 is a sectional view of a modified form of the invention shown in Figs. 1 and 2.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, one embodiment of the present invention is shown in Figs. 1 and 2 wherein a tool holder 10 is shown having a cylindrical portion 12 at its lower end within which extends a cutter shank 14. The latter is pivotally mounted in the tool holder 10 by a pin 16. As can be seen, the shank 14 has a lesser diameter than the inner diameter of the cylindrical portion 12 permitting a limited pivotal movement of the shank 14 within the cylindrical portion 12. The extent of this movement can be seen in Fig. 1 wherein the cutter shank 14 is shown at its extreme left position, and a phantom view 18 is shown for the extreme right position of the cutter shank 14.

Mounted on the lower end of the cutter shank 14 is a cutter head 20 having a plurality of cutting teeth 22 formed on its upper and lower conical faces. The cutter teeth are angularly disposed with respect to the axis of the cutter shank 14, as can be seen in the drawings, and terminate at the outer cylindrical portion 24.

Mounted on the tool holder 10 for axial movement with respect thereto is a collar 26 held in place by the set screw 28. Extending longitudinally of the collar 26 is an opening 30 into which is snuggly but slidably inserted one end of a flat spring 32. The flat spring 32 extends downwardly to the aperture 34 in the cylindrical portion 12 and has a portion 36 which extends at a right angle through said aperture 34 to be in spring biasing engagement with the cutter shank 14.

In use, the present deburring tool is mounted in the chuck of a drill press or the like and the tool while being turned is lowered to the hole of the work piece which is to be deburred. By virtue of the offset position of the cutter head 20 resulting from the biasing action of the spring 32, the cutter head 20 will not immediately enter the hole in the work piece, but instead will engage the edge of said hole permitting the cutting teeth 22 of the lower face to remove the burrs therefrom. As the tool holder 10 is lowered further by the drill press the angular portion of the lower face of the cutter head 20 will pilot the cutter head 20 into the hole where it can be passed through to the other end thereof. No cutting action will take place while the cutter head 20 is being passed through the hole because of the absence of any cutting edges on the cylindrical portion 24.

After the cutter head 20 has passed through to the other side of the work piece the flat spring 32 will again bias the cutter head 20 and cutter shank 14 to the offset position shown in Fig. 1. On the return stroke of the drill press the upper face of the cutter head 20 will engage the edge of the hole on the underside of the work piece, and the cutting teeth 22 of the upper face of the cutter head 20 will then remove any burrs from this edge of the hole. The angular portion of the upper face of the cutter head 20 will pilot the cutter head 20 into the hole permitting the tool to be withdrawn from the workpiece.

The present tool can be used for removing burrs from material or metals of different hardnesses. When burrs are to be removed from a work piece made of very hard metal, the collar 26 can be lowered on the tool holder 10 to shorten the effective length of the flat spring 32 to increase the spring biasing action which is exerted against the cutter shank 14. This will cause a greater downward pressure to be exerted by the cutter head 20 on the burrs being removed before the piloting action of the cutter head 20 takes place. Conversely, if the metal of the work piece is very soft, the collar 26 can be moved upwardly on the tool holder 10 to reduce thereby the spring biasing action of the spring 32.

If desired, when burrs or the like are being removed from materials which are relatively soft a different cutter head having a larger number of cutting teeth can be substituted for the one shown in the drawings so that more teeth will be in contact with the work piece during the cutting operation.

As can be seen, the present tool is self piloting in action. This is an important feature of the present invention since it prevents jamming which frequently occurs with burring tools of the type which require a pilot for guiding the cutter through the hole of the work piece. As is believed to be readily understood, during drilling operations, chips frequently are left in the hole, and when the subsequent deburring operations take place the pilot may become jammed in the hole because of the chips lodged therein. With the present invention, any chip which may be lodged in the hole will be dislodged and cut away by the cutting edges 22 thereby preventing jamming of the tool in the hole of the work piece.

Another feature of the present invention is that the tool can be used for long periods of time before it becomes necessary to resharpen it. Since the teeth 22 on one side of the cutter head 20 will become dull, first because they make initial contact with burrs and the like, the operator can periodically rotate the cutter head 20 with respect to the cutter shank 14 and thereby provide a new set of sharpened operative cutting teeth. The cutter head 20 is also particularly well suited for deburring a work piece having a crack or split in the edge of the hole, since a plurality of cutting teeth engage the edge of the hole to prevent one of the cutting teeth from being caught in the crack or split causing breakage of the tool as frequently occurs with single edge deburring tools.

Another embodiment of the present invention can be seen in Fig. 3 of the drawings to which reference is now made. In this embodiment like reference numbers are used to represent like parts of the embodiment heretofore described. The present embodiment distinguishes from the previously described embodiment in providing a different construction for spring actuating the cutter head 20 to an offset position. Here the cutter shank 50 is pivotally mounted to a cylindrical holder member 52 by the pin 16. A plunger member 54 is slidably mounted within the cylindrical member 52 and has an angular lower face 56 for engaging the upper end of the cutter shank 50. Seated on the upper end of the plunger member 54 is a compression spring 58 for biasing the plunger member 54 in a downward direction. A suitable lock screw arrangement 60 is provided above the compression spring 58 for adjusting the compression of the spring 58 and for locking it in place. As is believed to be readily understood, when the compression spring 58 biases the plunger member 54 downwardly the angular face 56 will initially engage one of the upper edges of the cutter shank 50 causing the latter to be pivoted to an offset position as shown in the drawings. During the deburring operations this modification of the invention will operate in substantially the same manner as the modification heretofore described.

Thus, it can be seen that a deburring tool has been provided which will enable the operator thereof to rapidly perform the deburring operation without a loss of time due to jamming of the tool or breakage thereof. Further, the tool can be used for deburring one edge of a hole or both edges thereof in one cycle of operation of the drill press. In addition, the tool can be readily adapted for use for metal or like materials of various hardnesses.

Further, the present deburring tool is ruggedly constructed to prevent breakage thereof and can be used for extended periods of time before resharpening thereof will be required. Also, it is designed to be easily and readily maintained and repaired at a minimum of cost.

Having thus described my invention, I claim:

1. A tool for removing burrs and the like from the edges of a punched or drilled hole comprising a holder member having an axial passage therein opening at one end thereof, a cutter shank having its one end extending through the opening into said axial passage and pivotally connected to said holder member, the other end of said cutter shank projecting outwardly from said holder member and having a cutter mounted thereon, and resilient means for biasing said cutter shank out of axial alignment with said holder member.

2. A tool for removing burrs and the like from the edges of a punched or drilled hole comprising a holder member having an axial passage therein opening at one end thereof, a cutter shank having its one end extending through the opening into said axial passage and pivotally connected to said holder member, the other end of said cutter shank projecting outwardly from said holder member and having a milling cutter mounted on the outer end thereof, said milling cutter having cutting teeth angularly disposed on its outer face, and resilient means for biasing said cutter shank out of axial alignment with said holder member.

3. A tool as claimed in claim 1 wherein said resilient means comprises a spring having its one end in biasing engagement with said cutter shank.

4. A tool as claimed in claim 1 wherein said resilient means comprises a compression spring seated in said holder member above said shank and a plunger slidably mounted in said holder and intermediate said shank and spring.

5. A tool as defined in claim 2 wherein said milling cutter has cutting teeth angularly disposed on its inner face.

6. A tool for removing burrs and the like from the edges of a punched or drilled hole comprising a holder member having a cylindrical lower portion with a transverse opening therein, a cutter shank extending into said portion and pivotally connected to said holder member, a collar mounted for axial adjustment on said holder member and having a longitudinal aperture therethrough, a spring having its one end slidably mounted in said longitudinal aperture and its other end extending through said transverse opening in biasing engagement with said cutter shank, said spring being shaped to permit the biasing action thereof to be varied on axial movement of said collar on said holder member.

7. A tool for removing burrs and the like from edges of a punched or drilled hole comprising a cylindrical holder member, a cutter shank extending into the lower end of said member and being pivotally connected thereto, a plunger in said cylindrical holder adapted to engage said cutter shank for pivoting said shank out of axial alignment with said cylindrical holder, a compression spring seated at its one end against said plunger for biasing said plunger against said shank, and means at the other end of said spring for varying the compression of said spring.

8. A self piloting deburring tool comprising a cylindrical holder member, a cutter shank pivotally mounted in said holder member so as to be substantially coaxially disposed thereof, a cutter head mounted on said cutter shank, said cutter head having a conical outer face with cutting teeth therein and spring means for biasing said cutter shank out of axial alignment with said holder member.

9. A self piloting deburring tool as defined in claim 8 wherein said cutter head has a conical inner face with cutting teeth therein.

EDWARD F. PACKARD.

REFERENCES CITED

The following references are of record in the file of this patent:

UNITED STATES PATENTS

| Number | Name | Date |
| --- | --- | --- |
| 1,980,178 | Berglund | Nov. 13, 1934 |
| 2,314,084 | Fried | Mar. 16, 1943 |
| 2,394,612 | Horne | Feb. 12, 1946 |
| 2,437,822 | Jones | Mar. 16, 1948 |